United States Patent Office 3,475,146
Patented Oct. 28, 1969

3,475,146
THIOPHANE-DIMETHYL DISULFIDE GAS ODORANT BLENDS
Sven A. Olund, San Rafael, Calif., assignor to Chevron Research Company, a corporation of Delaware
No Drawing. Filed Jan. 28, 1965, Ser. No. 428,830
Int. Cl. C10l 3/00; C10j 1/28; C10k 3/00
U.S. Cl. 48—196                                        2 Claims

ABSTRACT OF THE DISCLOSURE

Gas odorant composition comprising about 20 to 90 weight percent thiophane and about 10 to 80 weight percent dimethyl disulfide. This odorant mixture is added to a combustible hydrocarbon fuel gas at concentrations in the range of 0.2 to 2 lbs. per million cubic feet of fuel gas to impart a gassy odor to the fuel gas.

---

The present invention relates to blends of thiophane and dimethyl disulfide suitable for odorizing combustible hydrocarbon gases, such as natural gas, vapors and gases recoverable in the refining of petroleum and other gases suitable as fuels for heating, illuminating and cooking purposes.

Combustible gases suitable for heating, illuminating and cooking uses ordinarily have no marked inherent odor which would render their presence at low concentrations detectable. Therefore, when such gases escape from containers, transmission lines or fixtures it is possible for asphyxiative or explosive quantities of these gases to accumulate unnoticed by persons coming in contact with the gases. To remove this danger, it has been standard practice in the gas industry to add to the gas small quantities of a strongly odoriferous material to serve as a warning agent. By this means a characteristic and persistent odor is imparted to the gas which will give proper warning of leakage or danger.

In addition to being an adequate warning agent, an odorant of acceptable quality should be harmless and neither offensive, nauseating, toxic, nor lachrymatory, noncorrosive, insoluble in water, inexpensive and readily available, burn completely without harmful or odorous combustion products and possess a penetrating odor similar to the artificial gas smell.

Currently used gas odorants are of two types: mercaptans and organic sulfides. Mercaptans and mixtures thereof, although they exert an adequate impact on the unwary or inadvertent gas user, are not sufficiently stable in some systems and have a tendency to oxidize to poor odorant compounds. Olfactory fatigue is another deficiency of mercaptans. Furthermore, their odor is of an offensive, garlicy or oniony character.

Because of the deficiencies of the mercaptans, organic sulfides, which are more stable and have a desired gassy odor, are preferred odorants. One of the most satisfactory of the organic sulfide gas odorants is thiophane. This compound has the structural formula:

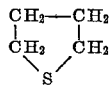

Even so, thiophane lags behind the mercaptan-type odorant in respect to odor intensity and initial impact on the olfactory sense. Moreover, its higher cost in comparison to the mercaptan-type odorant tends to discourage its use in many localities.

It has now been found that blends of thiophane and dimethyl disulfide have odor intensities greater than thiophane itself. Since dimethyl disulfide is an extremely poor odorant by itself (see for example U.S. Patent No. 2,064,-805, column 2, lines 26–28) it is truly surprising that the novel odorant blends of the invention exhibit excellent odorant properties.

Particularly, the novel odorant blends of this invention comprise from about 20–90 weight percent thiophane and from about 10–80 weight percent dimethyl disulfide. These new odorant blends impart to the combustible gas a characteristic, inoffensive "gassy" odor. They are also stable and give no adverse physiological effects.

Although small amounts of dimethyl disulfide, i.e., less than 10%, slightly enhance the odorant properties of thiophane, it is not practically feasible to add small amounts because of the increased cost of handling and mixing.

The combustible hydrocarbon fuel gas is odorized by introducing into the gas from about 0.2 to 2.0 pounds per million cubic feet of gas of the new odorant blend. Preferably, from about 0.2 to 1.0 pound per million cubic feet of gas are incorporated. At these concentrations the odorant is distinctly perceptible. Greater amounts of odorant may be incorporated; however, the odorizing effect tends to level off and such larger quantities generally impart stronger odors than are desired.

In practice the introduction of the odorant into the fuel gas is usually effected by means of an injection-type odorizer in which the odorant is pumped into a gas stream and vaporized. Alternatively, in a bypass absorption type odorizer a metered portion of gas may be saturated with the odorant and then mixed with the bulk of the gas. Because the volatility of dimethyl disulfide is quite near that of thiophane, blends of these ingredients are eminently suitable for the latter type of odorizer. Vapor pressure is a good indicator of volatility, and the following table illustrates the closeness in vapor pressures of dimethyl disulfide and thiophane.

TABLE I

|  | Vapor Pressure, p.s.i. | |
|---|---|---|
|  | Thiophane | Dimethyl Disulfide |
| Temperature, ° F.: | | |
| 30 | 0.17 | 0.2 |
| 60 | 0.40 | 0.4 |
| 100 | 1.01 | 1.0 |

These methods of odorizing gas are, of course, conventional expedients in the art and any other type of odorizing equipment may also be used.

These new blends have sufficiently high volatility to allow the odorized gas to be under pressures up to about 1,000 p.s.i.g. at relatively low temperatures without causing condensation of the blends. This makes such blends convenient for use in cold climates as well as more temperate climates.

Other known odorants may be used in conjunction with the new odorant blends of the present invention although they are not essential to it.

The method of mixing the new odorant blends is not critical since these materials are low boiling liquids. They can be mixed in the indicated proportions, i.e., in a manner applicable to the mixing of any compatible liquids.

To show the effectiveness of the new odorant blends of the present invention, odor tests were made according to the so-called "Walk-In-Room" test. According to this test, odor intensity is determined by comparing the odorant intensity of the new odorant blends with that of a standard odorant, in this case thiophane.

A room with approximately 1,500 cubic feet is used. The room has facilities for ventilation between tests and is free from any significant air movement during the tests. No odor other than that of the warning agent being tested is present during the tests. A 3.2 milliliter ethanol solution of the odorant is then vaporized into the room; the vaporization taking not more than five minutes to occur. The odorant concentration in the 3.2 milliliter solution is such as to give a concentration equivalent to that obtained from odorized gas diluted to 1% in air. Thus, at a concentration corresponding to one pound odorant per one million cubic feet gas and one volume percent gas concentration in the room the ethanol solution will contain 0.00213 gram odorant per milliliter of solution.

The person vaporizing the odorant does not participate in rating the samples to be tested, and at least 15 minutes is allowed between each test to allow the olfactory nerve to recover. After vaporization into the room, a five-membered odor panel evaluates the standard first and then rates the odors of the other odorant blends using the following arbitrary scale.

Odor intensity v. rating
Superior to standard _____ 5
Slightly better than standard _____ 4
Same as standard _____ 3
Slightly poorer than standard _____ 2
Inferior to standard _____ 1

The odor intensity is judged immediately after entering the room. Any unusual character of the odor is noted and recorded. The average ratings are then calculated and rounded off to the nearest one tenth. Finally, the results are interpreted using the above scale.

The data in the following table were determined according to the "Walk-In-Room" test. These data illustrate the comparison between dimethyl disulfide, thiophane and the novel gas odorant blends of the present invention. Thiophane, used as the standard odorant at the indicated concentration, was assigned the base value of 3.

TABLE II

| Odorant | Average odor ratings ½ lb. per million cubic feet |
|---|---|
| Thiophane—100% | 3 |
| 75% Thiophane / 25% Dimethyl disulfide | 3.3 |
| 50% Thiophane / 50% Dimethyl disulfide | 3.5 |
| 25% Thiophane / 75% Dimethyl disulfide | 3.3 |
| 10% Thiophane / 90% Dimethyl disulfide | 2.6 |
| Dimethyl disulfide—100% | 1.8 |

In the same manner, a blend of thiophane and diethyl disulfide was tested and found to be less effective than thiophane. The data from this testing, which are tabulated below, show the uniqueness of the novel blends of the present invention.

TABLE III

| Odorant | Average odor ratings ½ lb. per million cubic feet |
|---|---|
| Thiophane—100% | 3 |
| 50% Thiophane / 50% Diethyl disulfide | 2.4 |
| Diethyl disulfide—100% | 1.9 |

Obviously, modifications and variations of the invention as hereinabove set forth may be made without departing from the spirit and scope thereof; and, therefore, only such limitations should be imposed as are indicated in the appended claims.

I claim:
1. A hydrocarbon fuel gas odorant composition consisting essentially of about 20 to 90 weight percent thiophane and about 10 to 80 weight percent dimethyl disulfide.

2. An odorized gas consisting essentially of a hydrocarbon fuel gas and about 0.2 to 2.0 pounds per million cubic feet of said hydrocarbon fuel gas of an odorant blend consisting essentially of about 20 to 90 weight percent thiophane and about 10 to 80 weight percent dimethyl disulfide.

References Cited

UNITED STATES PATENTS

| | | |
|---|---|---|
| 2,001,715 | 5/1935 | Fischer. |
| 2,064,805 | 12/1936 | Hampton et al. _____ 48—195 |
| 2,807,592 | 9/1957 | Johnson et al. _____ 48—195 X |
| 2,823,104 | 2/1958 | McClure _____ 48—195 |
| 2,872,304 | 2/1959 | Eaton et al. _____ 48—195 |
| 2,935,391 | 5/1960 | Evans et al. _____ 48—195 |

JOSEPH SCOVRONEK, Primary Examiner

U.S. Cl. X.R.
48—195, 197; 252—408